William Lyon Sherwood.

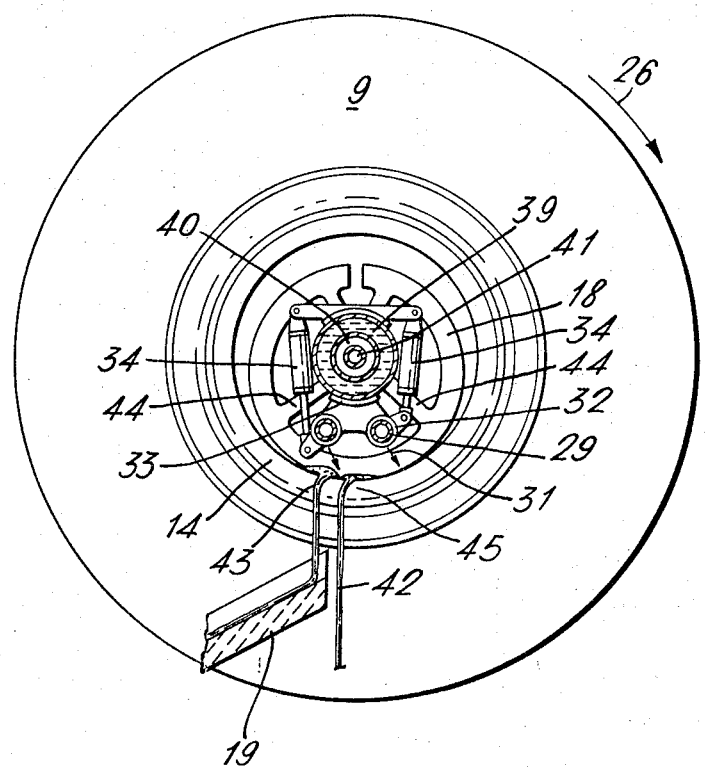

United States Patent Office 3,353,810
Patented Nov. 21, 1967

3,353,810
HEATING AND DISCHARGE APPARATUS FOR FUSED MATERIALS IN ROTARY FURNACES
William Lyon Sherwood, 2678 Marine Drive,
West Vancouver, British Columbia, Canada
Filed Dec. 7, 1964, Ser. No. 416,407
9 Claims. (Cl. 266—37)

The invention relates to rotary furnaces employed for the manufacture of fused products and, more particularly, to an improved apparatus for heating and discharging liquid metal and slag from rotary furnaces.

In the continuous or semi-continuous processing of fused charge materials in rotary furnaces, the liquid products can be discharged conveniently through an axial opening at the discharge end of the furnace, which also provides a convenient aperture for heating of the furnace. Sealing of such an axial discharge opening is also desirable, to limit the free flow of air or furnace gases between the furnace interior and the outside atmosphere.

When there are both liquid metal and liquid slag being processed within rotary furnaces and which discharge by overflowing through a restricted axial discharge opening, the slag tends to flow through the furnace at an uncontrolled rate, residing in the furnace for a shorter period than the metal before discharge, and without allowing sufficient slag-metal reaction time for optimum control of metal chemistry. Slag and metal also normally exit together in a single stream, requiring a subsequent additional slag separation operation.

An object of the present invention is to provide means for regulating the rate of slag flow through a rotary furnace by controlling the rate of slag discharge through an axial discharge opening, at the same time providing means for discharging liquid metal in a continuous or semi-continuous manner, avoiding build-up of solidified slag or metal along the inner surfaces of the discharge opening.

Another object of the present invention is to provide means for separating the slag from the metal prior to discharging and for discharging metal and slag separately from an axial rotary furnace discharge opening.

Another object of the present invention is to provide sealing means for a rotary furnace axial discharge opening whilst at the same time allowing metal and slag discharge through the opening, thereby excluding excessive secondary air and facilitating furnace atmosphere control when operating under negative pressure and counter-current flow of gases within the furnace.

Another object of the present invention is to provide a means to maintain a burner assembly with attached slag barrier in a set position, in the axial direction, in relation to an axial discharge opening of a rotary furnace during operation and, at the same time, to provide means of changing said set position, as required by operating conditions.

A further object of the present invention is to provide a vertical, as well as axial, adjustment of slag barrier position within a rotary furnace axial discharge opening, thereby closely controlling the depth of slag barrier penetration into the slag layer.

A still further object of the present invention is to provide convenient means for removing a burner assembly from a rotary furnace axial discharge opening to provide easy access to the furnace interior and to facilitate furnace repair.

Other objects and advantages of the present invention will become apparent from the description which follows hereinafter.

A preferred embodiment of the invention, selected for the purposes of illustration, is shown in the accompanying drawings, in which:

FIGURE 2 is an end view taken along the line 2—2, omitting the heating and sealing devices for the furnace discharge opening to illustrate the apparatus for regulating slag flow and dividing metal and slag into separate discharging streams.

Figure 1:
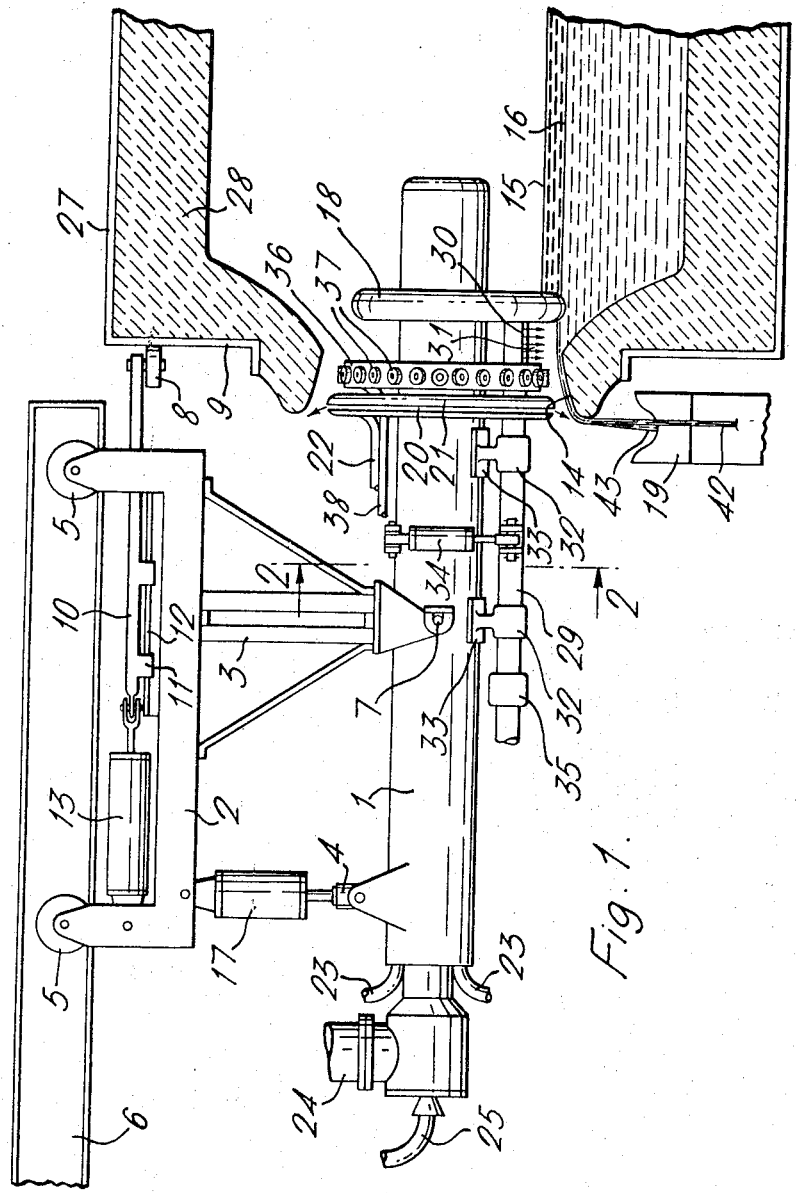
FIGURE 1 is a side elevation view, with the furnace discharge end shown in section, illustrating a burner assembly including heating, slag flow regulating and sealing means for the axial furnace discharge end opening.

Referring to the drawings, burner 1 is mounted for precise and adjustable positioning in relation to the furnace discharge lip 14. In the embodiment illustrated, the burner is centrally connected to carriage 2 by way of fixed support leg 3 and terminating at pivot bearings 7. Vertical movement of the burner nozzle is thereby effected by lengthwise vertical rotation of burner 1 about pivot bearings 7 by altering the length of retractable support leg 4 which connects carriage 2 and the rear end of the burner 1, by actuating hydraulic cylinder 17. The carriage 2, in turn, rests on wheels 5 running along tracks 6 to allow movement of the entire assembly in relation to the furnace discharge end, the carriage 2 is linked to the furnace by way of retractable spacing arm 10 terminating in roller 8 held in contact with rotating furnace end plate 9. Spacing arm 10 rests on bearing shoes 11 which run guide track 12 mounted on carriage 2, enabling the length of spacing arm 10 to be adjusted by activating hydraulic cylinder 13. Contact pressure between roller 8 and reactor end plate 9, which is rotating as indicated by arrow 26, is maintained by means of biasing apparatus comprising springs, or comprising counterweights attached by cable to the carriage assembly through pulleys (not illustrated); or alternatively, a track mounted on reactor end plate 9 to confine roller 8, or its equivalent, in both axial directions simultaneously.

A plurality of functions, including heating of the furnace, regulation of slag flow, separation of metal and slag, heating of the discharge lip and sealing of the discharge opening, may be accomplished conveniently by a combination of devices incorporated into a single assembly which, in turn, is supported within the discharge opening by the hereinbefore described positioning apparatus. The devices for directly controlling heating and discharge conditions are thereby adjustably located for most effective application.

For controlling slag flow and discharge, slag dam 18 is arranged perpendicular to the furnace axis for projection downwardly through the slag layer 15, at least to metal level 16. Extending longitudinally from either side of discharge lip 14 to intersect dam 18 at approximately right angles are gas curtain slag dividers 31 of sufficient velocity to penetrate and divide the slag, and directed to restrict slag flow laterally inwards into central discharge control gap 45. The gas curtain dividers 31 are emitted from longitudinal slits 30 of gas header pipes 29 which, in turn, are mounted for rotation within support bearings 32 held by brackets 33 in fixed relation to the underside of burner 1. Positioning of gas curtain slag dividers 31 at selected distances from the centre of discharge control gap 45 is effected by rotating gas header pipes 29 by means of hydraulic cylinders 34 or equivalent mechanical devices. In this way, flow of slag into the slag-free metal surface area of discharge control gap 45 is limited to any desired degree, even entirely stopped. As illustrated in FIGURE 2, by allowing slag flow only into one side of the flow control gap 45, slag may be discharged in a separate stream 43, facilitating convenient disposal by way of refractory slag trough 19, the metal stream 42 passing directly into casting apparatus.

In the embodiment shown, main slag dam 18 is water cooled and supplied with circulating cooling water from burner water jacket 39 through the slag dam support pipes 44. The main dam could also comprise solid refractory material or a gas curtain. Gases suitable for gas curtain slag dividers include butane, propane or argon, which may be heated, and supplied under pressure to rotatable gas header pipes 29 through swivel joint 35.

In order to minimize any tendency towards freezing and accumulation of solidified metal and slag on the discharge opening surfaces, auxiliary burners 37, mounted on annular header pipe 36, are directed radially outward to impinge on the inner surface of discharge lip 14. This heat is most effective when concentrated on a segment of the discharge opening adjacent to the discharging metal stream, in a manner to heat the discharge lip surface just prior to its contact with the liquid metal. Fuel and air for combustion are supplied by pipes 38. An alternative but more complex and costly auxiliary heating method involves electric resistance elements embedded in the discharge lip refractories. In addition to heating, refractory materials which are non-wetting towards liquid metal and slag are beneficial in this respect.

In order to seal the discharge opening, a sealing curtain of gas is emitted from the longitudinal slit 20 in annular seal header pipe 21, directed outwardly and at an angle in opposition to the anticipated flow of secondary air into the furnace, to impinge on the inner walls on the discharge lip 14. The annular seal header pipe 21 is connected by a sealing plate to burner 1 and is supplied with gas under pressure through duct 22. The gas may be air, or a neutral or reducing gas, for example, nitrogen and argon. Alternatively, to avoid oxidation of the discharging metal whilst minimizing consumption of non-oxidizing gas, the annular header pipe may be constructed in two or more sections, air being employed as a sealing medium for the major portion of the discharge opening periphery, and argon or other non-oxidizing gas, or a burner flame, being employed for the lower portion of the gas curtain which impinges in the region of the discharging liquid streams. Still another alternative is to supply the annular header pipe 20 with the combustion products from an oil or gas burner with an enclosed combustion chamber connected to duct 22. This latter arrangement has the advantage of simultaneously heating and sealing discharge lip 14 with a non-oxidizing gas, but requires the use of water cooling or special heat-resisting materials for supply pipe 22 and annular header pipe 21.

The outer burner pipe is preferably water-cooled by water supplied and discharged through pipes 23, and circulated to the water-cooled surfaces of the burner assembly by a suitable arrangement of baffles or pipes secured inside burner water jacket 39, in a manner analogous to that employed in known water-cooled burners and oxygen lances. Air, which may be preheated or enriched with oxygen, is supplied to the burner nozzle by way of flexible air pipes 24 and burner air annulus 40, fuel by flexible fuel pipes 25 and burner fuel pipe 41.

Several possible variations of the apparatus of this invention have been described and it will be appreciated that there are additional variations and modifications which may be made without departing from the scope of the invention defined in the appended claims.

I claim:

1. In a rotary furnace for continuous processing of fused metal and slag, the combination comprising: an axial discharge opening having a burner directed into said discharge opening with slag dam means and slag divider means attached to said burner forming an integral burner assembly adapted for heating said furnace, limiting and regulating the rate of slag flow into said discharge opening and separating slag from metal prior to discharge; movable carriage means supporting said burner assembly; connecting means linking said carriage means and the furnace adapted for maintaining a selected set position in the axial direction of said burner assembly in relation to said discharge opening despite axial furnace movement during operation; horizontal positioning means adapted for changing said selected set position of the discharge end burner in relation to said discharge opening; vertical adjustment means between said carriage means and said burner assembly for effecting controlled vertical movement of said slag dam means and slag divider means in relation to said discharge opening; and discharge means adapted for discharging a metal stream and at least one separate slag stream from said discharge opening.

2. In a rotary furnace for continuous processing of fused metal and slag the combination comprising: an axial discharge opening; a slag dam attached to a movable support and positioned within the furnace transversely across the discharge opening for obstruction of the free flow of slag longitudinally along the furnace centre into said discharge opening; and at least two gas curtain slag dividers, one on either side of the discharging metal stream, arranged longitudinally for impingement downwards to divide the slag along planes connecting said slag dam and the inner furnace end wall adjacent to said discharge opening for obstructing slag flow transversely inwards within the confined spaced between said slag dam and said discharge opening.

3. An apparatus as in claim 2 wherein at least one of said slag dividers is emitted from a longitudinal slit nozzle along a longitudinally arranged pipe mounted within said discharge opening for direction of said dividers by controlled rotation of said pipe to effect impingement of said slag dividers to divide the slag at selected, controlled transverse distances from a metal stream discharging over the central bottom area of said discharge opening.

4. In a rotary furnace for continuous processing of fused metal and slag, the combination comprising: an axial discharge end opening; a burner projecting into said opening having a slag dam projecting downwardly from the front nozzle portion thereof; a carriage supporting said burner at one place by a horizontal pivot substantially at right angles to the longitudinal furnace axis and at a second place by a vertical positioning member adapted to effect controlled vertical rotation lengthwise of said burner about said pivotal mounting for vertically positioning said slag dam within the furnace discharge opening; a connecting member between said carriage and said furnace having a moving contact with the discharge end of said furnace during rotation and adapted for maintaining a selected distance of projection of said burner and slag dam into said discharge opening during furnace operation.

5. An apparatus as in claim 4 wherein said connecting member is adjustable for alternation of said selected distance of projection of said burner into said discharge end opening during furnace operation.

6. An apparatus as in claim 4 which also includes a sealing device comprising an annular gas curtain emitted radially outwards under pressure from at least one annular slit nozzle to impinge upon the inner surface of said discharge opening thereby being adapted to prevent the free interchange of gases between the furnace interior and the outside atmosphere.

7. In a rotary furnace for continuous processing fused metal and slag floating on the metal, the combination comprising; an axial discharge opening discharging metal and slag over its lip; a slag dam attached to a support positioned within the furnace transversely across said discharge opening for obstruction of the free flow of slag longitudinally along the furnace centre into said discharge opening; at least two slag dividers arranged in the space and connecting between said slag dam and said discharge opening, one of said slag dividers being positioned on either side of the discharging metal stream, each obstructing the flow of slag transversely inwards from either side to the centre of the discharge opening, with one of said slag dividers being positioned at an adjustable distance from the discharging stream to thereby allow discharge of slag through said discharge opening to one side of the centrally discharging metal stream in a substantially separate slag stream.

8. An apparatus as in claim 7 wherein at least one of said slag dividers comprises a gas curtain emitted from an elongated slit nozzle along a longitudinally arranged pipe mounted within said discharge opening and directed downwardly to divide the slag at selected, controlled transverse distances from said centrally discharging metal stream.

9. In a rotary furnace for continuous processing of fused metal and slag with an axial discharge opening having a burner directed into said discharge opening, the combination of an integral burner assembly adapted for heating said furnace, limiting and regulating the rate of slag flow into said discharge opening and separating slag from metal prior to discharge which comprises a movable carriage means supporting said burner assembly; connecting means linking said carriage means and the furnace adapted for maintaining a selected set position in the axial direction of said burner assembly in relation to said discharge opening despite axial furnace movement during operation; horizontal positioning means adapted for changing said selected set position of the discharge end burner in relation said discharge opening; vertical adjustment means between said carriage means and said burner assembly for effecting controlled vertical movement of said slag dam means and slag divider means in relation to said discharge opening; a slag dam attached to said burner assembly and positioned within the furnace transversely across said discharge opening for obstruction of the free flow of slag longitudinally along the furnace centre into said discharge opening; at least two slag dividers arranged in the space and connecting between said slag dam and said discharge opening, one of said slag dividers being positioned on either side of the discharging metal stream, each obstructing the flow of slag transversely inwards from either side to the centre of the discharge opening, with one of said slag dividers being positioned at an adjustable distance from the discharging stream to thereby allow discharge of slag through said discharge opening to one side of the centrally discharging metal stream in a substantially separate slag stream.

References Cited
UNITED STATES PATENTS

| | | | |
|---|---|---|---|
| 2,079,872 | 5/1937 | Quinn | 266—37 |
| 2,478,557 | 8/1949 | Bell et al. | |
| 2,554,836 | 5/1951 | McFeaters | 266—37 |
| 2,712,961 | 7/1955 | Richardson. | |
| 3,174,200 | 3/1965 | Keel et al. | 22—214 |
| 3,235,242 | 2/1966 | Fukuda | 266—36 X |

J. SPENCER OVERHOLSER, *Primary Examiner.*

E. MAR, *Assistant Examiner.*